Aug. 6, 1968  H. H. JAMON  3,396,353
ELECTRIC OVERLOAD RELAY
Filed Nov. 15, 1965  3 Sheets-Sheet 1
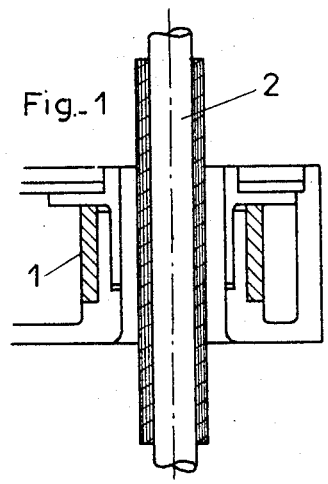
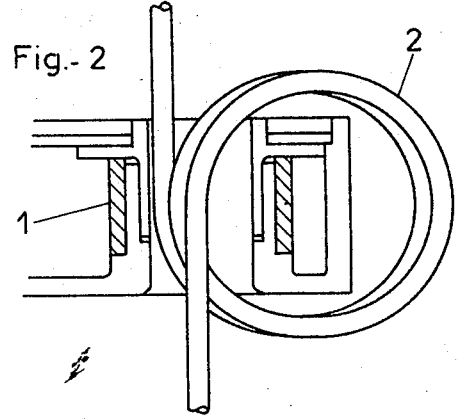
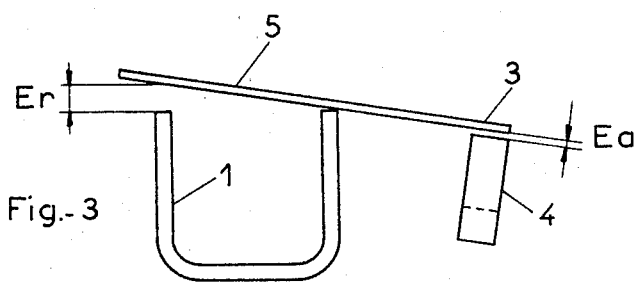
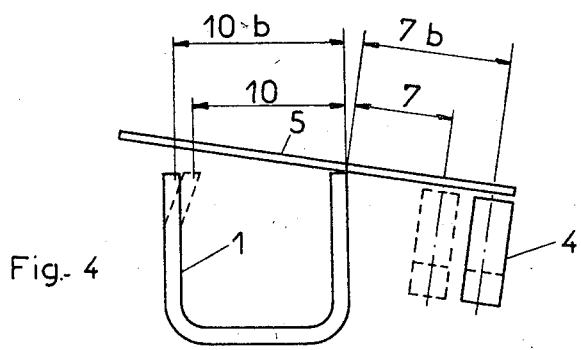
Inventor
Henri Hubert Jamon
by Michael J. Striker
Attorney

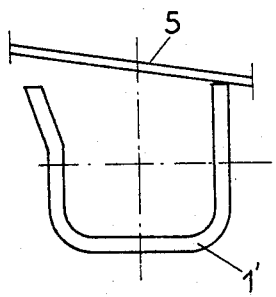
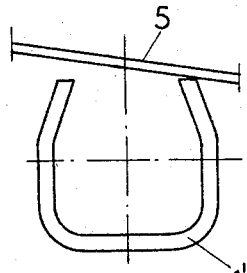
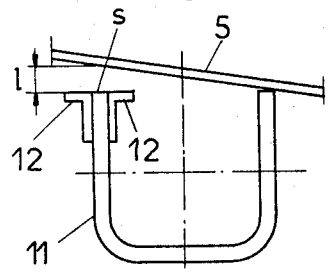
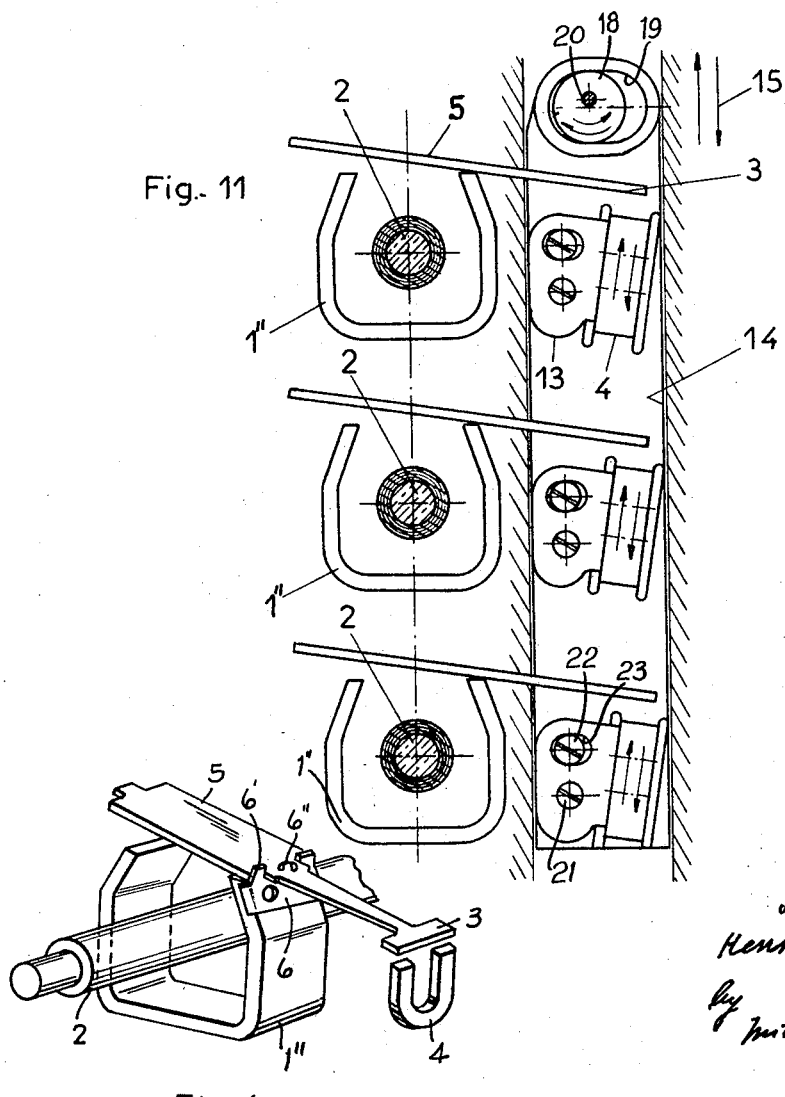

United States Patent Office 3,396,353
Patented Aug. 6, 1968

3,396,353
ELECTRIC OVERLOAD RELAY
Henri H. Jamon, Soisy-sous-Montmorency, France, assignor to Satra Societe Achat et Transactions, Vaduz, Liechtenstein
Filed Nov. 15, 1965, Ser. No. 507,951
Claims priority, application Switzerland, Nov. 14, 1964, 14,713/64
14 Claims. (Cl. 335—229)

ABSTRACT OF THE DISCLOSURE

An electric overload relay including elongated armature means of magnetizable material, electromagnet means including a member of magnetizable material arranged adjacent one end portion of the elongated armature means spaced by an airgap therefrom and current carrying conductor means or magnetizing the member to create a first magnetic field depending on the current flowing through the conductor means and tending to move the armature means in one direction, and permanent magnet means arranged adjacent an opposite end portion of the armature means also spaced by an airgap therefrom and producing a second magnetic field tending to move the armature means in a direction opposite to the first direction, the second magnetic field having a magnitude so that the armature means will move in the first direction only when an overload current of predetermined magnitude flows through the conductor means.

---

The present invention relates to an electric overload relay to indicate overload currents in one-phase or in multiphase electric networks. The electric overload relay of the present invention may be a one phase or a polyphase relay and be constructed to indicate relatively small overload currents or very large overload currents as will occur especially during short circuits in the network to which the relay is connected.

Such overload relays usually include an electromagnet and movable armature spaced by an air gap from one pole or the poles of the electromagnet so that when current flows through the winding of the electromagnet, an electromagnetic force is produced in the air gap which attracts the armature and the movement of the armature in a direction reducing the air gap may be used for operating of contacts when the latter are connected to the armature.

It is also known that such relays need for their actuation a certain minimum number of ampere turns which usually may be varied between a minimum value and a value up to three times the minimum value. A change of the point of response of the relay may be obtained within these limits either by varying the air gap of the magnetic circuit or by providing a variable reset moment acting on the movable armature. Disregarding the variable ampere turns which can be changed in relation of 1:3 a change of the minimum current at which the over load relay will respond is only possible by changing the number of turns of the winding of the electromagnet which up to now has been relatively high.

It is an object of the present invention to provide for an overload relay which will act at an overload current of predetermined magnitude. It is a further object of the present invention to provide for an overload relay which can be adjusted within wide limits so that it will respond to relatively small overload currents as well as to relatively high overload currents.

It is an additional object of the present invention to provide an overload relay of the aforementioned type which can be adjusted within wide limits and in which the winding of the electromagnet of the relay has a very small number of turns.

With these objects in view, the electric overload relay according to the present invention mainly comprises elongated armature means of magnetizable material, electromagnetic means including a member of magnetizable material arranged adjacent one end portion of the elongated armature means spaced by an air gap therefrom and current carrying conductor means having less than 10 turns for magnetizing the member to create a first magnetic field depending on the current flowing through the conductor means and tending to move the armature means in one direction, and permanent magnet means arranged adjacent an opposite end portion of the armature means spaced by an air gap therefrom and producing a second magnetic field tending to move the armature means in a direction opposite to the first direction, the second magnetic field having a magnitude so that the armature means will move in the first direction only when an overload current of predetermined magnitude flows through the conductor means.

In a preferred form the electric overload relay further includes adjustable mounting means mountnig the permanent magnet means for adjusting the position thereof relative to the armature means to thereby change the action of the second magnetic field on the armature means so that the latter will move in the first direction when an overload current having a magnitude different from the above-mentioned predetermined magnitude flows through the conductor means.

The member of the electromagnet means is preferably a U-shaped member having a pair of legs and the armature means is preferably in the form of a lever mounted intermediate its ends for tilting movement about a tilting axis located in the region of the free end of one of the legs of the U-shaped member. The lever extends to opposite sides of its tilting axis and is separated at one end portion thereof by an air gap from the free end of the other leg of the U-shaped member whereas the permanent magnet means is arranged in the region of the other end portion of lever separated by an air gap therefrom.

The conductor means may extend in less than 10 turns about one of the legs of the U-shaped member, or the conductor means may be in the form of a single substantially straight conductor passing between the legs of the U-shaped member. Such a single conductor may form a portion of an uninterrupted insulated conductor to be guarded by the overload relay, or the single conductor may be connected at opposite ends thereof in parallel to a conductor to be guarded by the relay.

The novel features which are considered as characteristic for the invention are set forth in particular in the appended claims. The invention itself, however both as to its construction and its method of operation, together with additional objects and advantages thereof, will be best understood from the following description of specific embodiments when read in connection with the accompanying drawings, in which:

FIG. 1 is a partial cross-sectional view through a relay according to the present invention and showing the electromagnet thereof with a single winding;

FIG. 1a is a perspective schematic view of a relay similar to FIG. 1 in which the exciter winding of the electromagnet thereof is formed by a straight conductor;

FIG. 2 is a cross section similar to FIG. 1 and showing an electromagnet with a plurality of windings;

FIGS. 3 and 4 are schematic side views of the relay which permit explanation of the mode of operation thereof as expressed in the curves illustrated in FIGS. 5-7;

FIGS. 8-10 are schematic views of various embodiments of the member of magnetizable material of the electromagnet of the relay; and FIG. 11 is a schematic illustration of a practical embodiment of a three phase relay according to the present invention.

Figure 5:
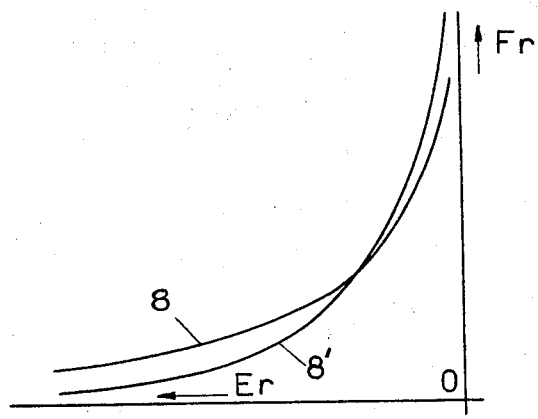

FIGS. 1 and 2 schematically illustrate cross-sections through the electromagnet of the relay of the present invention. In the arrangement as shown in FIG. 1 the magnetic field in the U-shaped member 1 of magnetizable material of the electromagnet of the relay is induced by a conductor 2 forming part of the network to be guarded by the relay, and extending substantially straight between the legs of the U-shaped member 1. The conductor 2 may be a portion of an uninterrupted insulated cable to be guarded by the relay, or the conductor 2 may be an insulated conductor which is at opposite ends thereof connected in parallel to the conductor to be guarded by the relay.

As shown in FIG. 1a, the relay of the present invention basically comprises an electromagnet including a substantially U-shaped member 1″ and an exciter winding shown in FIGS. 1 and 1a as a straight insulated conductor 2 passing between the legs of the member 1″ an armature 5 in form of a two-armed lever pivotally connected to one leg of the member 1″ for instance by a clip 6 having a pair of spaced projections 6′ respectively engaging opposite side edges of the armature lever 5 and a central projection 6″ projecting through a central opening of the armature lever, and a permanent magnet 4 cooperating with a plate-shaped portion 3 at one end of the armature lever.

FIG. 2 illustrates a modification of the arrangement shown in FIG. 1 and in this arrangement the single conductor shown in FIG. 1 is replaced by a plurality of windings 2 of the conductor to be guarded by the relay which are wound about one leg of the U-shaped member 1 whereby for a given current flowing through the conductor the ampere turns of the relay can be increased.

A special feature of the relay of the present invention is that the restoring or reset moment of the movable armature 5 (FIG. 3) is produced by a permanent magnet 4 which acts on a plate 3 of magnetizable material integrally formed on one end of an elongation of the movable armature 5 of the magnetic circuit. The length of the elongation of the lever arm can preferably be determined in such a manner that the curve 8 (FIG. 5) which illustrates the reset moment Fr as a function of the displacement Er (FIGS. 3 and 5) of the movable armature 5 has an exact predetermined steepness corresponding to the desired purpose. An increase of the lever arm of the armature on which the permanent magnet 4 acts from the dimension 7 to the dimension 7b (FIG. 4) will result in an increase of the steepness of the reset curve 8 to the steepness of the reset curve 8′ (FIG. 5) whereas a reduction of this lever arm will produce the opposite result.

Figure 6:
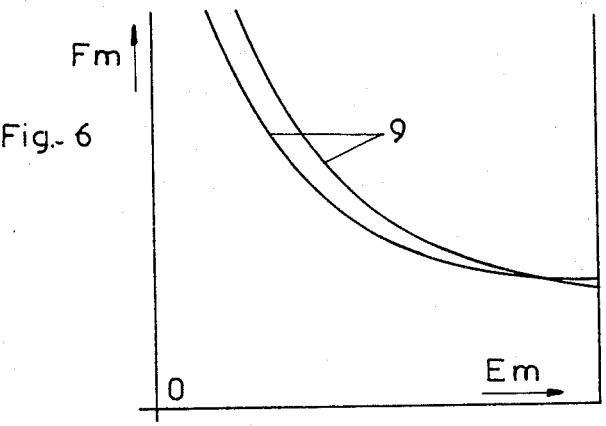

A superimposition of one of the curves of FIG. 5 and one of the attracting moment curves 9 (FIG. 6) permits the determination of the dimensions $Fu_1$, $Fu_2$ (FIG. 7) which are respectively proportionate to the attracting moments acting on the movable armature at any point of its displacement which can be expressed by $E/K$. As is evident from FIG. 7 the moment $Fu$ increases rapidly as a function of the displacement of the armature in a direction closing the magnetic circuit and that this increase will occur the faster the steeper the curve of the resetting moment as well as the curve of the attracting moment is.

Figure 7:
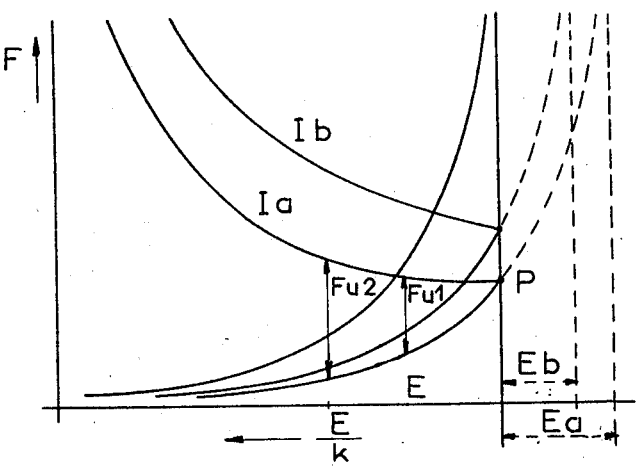

In this way it is possible to correlate the dimension of the reset lever arm between 7 and 7b as well as the length of the other lever arm of the movable two-armed armature lever between 10 and 10b with each other in order to obtain, starting from a displacement $E/K$ of the movable armature which is a fraction of the total displacement $Em$ (FIG. 6), the desired usable moment $Fu_2$ (FIG. 7).

For instance the initial displacement of the movable armature may be fixed to one-third or one-half of the total available displacement so that two-thirds or the half of the total available displacements will remain during which a moment will be produced which is greater than the moment $Fu_2$ (FIG. 7) which can be considered as the minimum moment necessary for instance to actuate contacts or to release a locking mechanism so as to produce the desired action of the overload relay. Since the usable closing moment $Fu_1$, $Fu_2$ (FIG. 7) rapidly increases as a function of the displacement E of the movable armature from the turning point P, the armature will move suddenly and securely while remaining before its movement in stable position free of vibrations.

The features characteristic for the present invention permit to produce a relay which will be actuated by currents $Ia$, $Ib$ (FIG. 7) which, by simple change of the air gap $Ea$, $Eb$ (FIGS. 3 and 7) between the permanent magnet and the portion 3 of the armature (FIG. 3) may be changed to a ratio of at least 1–13. This permits a simple construction in which adjustment of the relay can for instance be carried out by displacement of the permanent magnet 4 in a direction normal to the plane of the armature portion 3.

It is also possible to obtain an actuation of the relay at greatly differing ampere turns, which may for instance be smaller than 100 ampere turns, but which may also be considerably greater than 4000 ampere turns. The adjustment range of 1 to 13 of the relay of the present invention obtainable in the above-described manner can even be enlarged by the use of different magnetic circuits for the electromagnet of the relay. For instance it is possible to use metals of different magnetic permeability, from soft iron to hysteresis free material for the member 1 of the electromagnet of the relay. It is also possible to change the form of the member 1 of the electromagnet from the form as shown in FIG. 3 in which the member 1 is a U-shaped member having parallel legs to a member 1′ as shown in FIG. 8 in which one of the legs of the U-shaped member has an end portion inclined in a direction away from the other legs of the member 1′ or to use a member 1″ as shown in FIG. 9 in which the free ends of both legs are inclined towards each other whereby the lever arm of the armature on which the magnetic field produced by the magnetizable member of the electromagnet of the relay acts may be changed in order to produce the desired closing moment of the relay.

The usable closing moment of the relay may also be increased by forming the air gap between the movable armature 5 and the U-shaped member 11 (FIG. 10) in a specific manner, especially by mounting of pole shoes 12 on the free end of one leg of the U-shaped member 11. Even if the pole shoes 12 are formed from a metal of mediocre magnetic permeability, a considerable reduction of the magnetic reluctance of the magnetic circuit will occur and thereby a considerable increase of the available closing moment will result.

The magnetic reluctance of a magnetic circuit $$R = k \frac{l}{\mu \cdot S}$$

wherein $l$ is the length of the magnetic circuit, $S$ is the cross section thereof, and $\mu$ the permeability of materials forming the circuit. Since the permeability $\mu$ of the air in the air gap of the length $l$ of the magnetic circuit is a few thousand times smaller than that of the magnetic metals forming the circuit it will be evident that the magnetic reluctance of the magnetic circuit when the relay is in open condition will depend essentially on the magnetic reluctance of the air in the air gap. In order to reduce the magnetic reluctance without changing the length $l$ (FIG. 10) of the air gap it is advantageous to artificially increase the cross section S of this air gap.

By interchangeable use of different magnetizable members for the electromagnet of the relay and by changing the air gap between the permanent magnet and the elongation 3 of the armature 5 it is possible to adjust the relay for actuation by currents which may vary at a ratio from 1:40 without changing the exciter circuit for the electromagnet of the relay.

An especially advantageous arrangement is obtained if the permanent magnet 4, which counteracts the closing moment of the relay, is mounted on an adjustable bracket 13, as shown in FIG. 11, which permits an exact adjustment of the permanent magnet 4 relative to the lever arm 3 of the armature with which it cooperates.

If the relay is a poly-phase relay, for instance a three-phase relay, it is advantageous to mount the brackets 13 which respectively carry the permanent magnets 4 on an elongated carriage 14 guided for movement in a direction substantially normal to the elongation of the armatures 5, as indicated by the arrows 15 in FIG. 11, and provided at one end thereof with operating means for moving the carriage 14 in one or the opposite direction indicated by the arrows 15. The operating means may comprise, as shown in FIG. 11, an eccentrically mounted disk 18 cooperating with an internal cam face 19 in the form of a closed loop so as to move the carriage 14 in one or the other direction during turning of the disk in clockwise or counterclockwise direction. The eccentric shaft 20 fixed to the disk is preferably provided with a turning knob, not shown in the drawing, which may be provided with graduations cooperating with a fixed graduation to permit exact adjustment of the carriage 14 and the permanent magnets 4 mounted thereon. Each bracket 13 is mounted on the carriage by means of two screws 21, 22 and the shank of the upper one of the two screws extends through an elongated slot 23 in the bracket 13 so that the position of each bracket 13 on the carriage 14 may be adjusted by turning the bracket about the axis of the lower screw within the limits established by the length of the slot with which the upper screw cooperates. The arrangement illustrated in FIG. 11 permits adjustment of the position of all permanent magnets 4 relative to the armatures by moving the carriage 14 in one or the other direction and to adjust each permanent magnet relative to the portion 3 of the armature by turning the brackets 13 in the aforementioned manner.

Due to the fact that the number of turns for the exciter circuit of the electromagnet of the relay of the present invention is in all cases very small, it is possible to use for the exciter circuit a conductor which is insulated for the operating voltage of the electric conductor to be guarded by the relay. The relay of the present invention has therefore the advantage that a special insulation of the current carrying part of the relay is not necessary even if the relay is connected to networks through which a current of high voltage flows, which may exceed 5000 volts. In addition to the advantage that the relay of the present invention which may also be a multiphase relay may be directly connected to a network under high tension, the relay according to the present invention has an additional advantage which results from the fact that the number of turns for the exciter current is in all cases very small, and actually the conductor of the exciting circuit may be a single straight conductor as shown in FIG. 1, whereby the inductance of the electrical circuit of the relay may be reduced to a negligible value and thereby the time of reaction of the relay also be reduced to very small value.

Due to the above mentioned advantages derivable with the relay of the present invention, these relays are especially suitable for mine installations. Mine installations use, increasingly, machines of high output operated by large electromotors which have to be supplied with current from a network of high tension and require a relay having a fast reaction time. The specific features of the relay of the present invention make it especially usable for such an application.

It will be understood that each of the elements described above, or two or more together, may also find a useful application in other types of electrical overload relays differing from the types described above.

While the invention has been illustrated and described as embodied in an electrical overload relay having a movable armature acted upon on the one hand by an electromagnet having an exciter winding directly connected to the network to be guarded by the relay and acted upon on the other hand by a permanent magnet, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric overload relay comprising, in combination, electromagnet means including a substantially U-shaped member of magnetizable material having a pair of legs, each having a free end, and current carrying conductor means for magnetizing said member to create a first magnetic field; a lever of magnetizable material mounted intermediate its ends tiltable about a tilting axis located in the region of the free end of one of said legs, said lever extending to opposite sides of said tilting axis and being separated at one end portion thereof by an air gap from the free end of the other leg; permanent magnet means arranged adjacent the opposite end portion of said lever separated by another air gap therefrom and producing a second magnetic field tending to tilt said lever about said pivot axis in a direction opposite to a first direction in which said first magnetic field tends to pivot said lever, said second magnetic field having a magnitude so that said lever is tilted in said first direction only when an overload current of predetermined magnitude flows through said conductor means; and adjustable mounting means carrying said permanent magnet means for adjusting the position of the latter relative to said other end portion of said lever.

2. An electric overload relay as set forth in claim 1, wherein said overload relay is a ployphase relay having a plurality of levers superimposed in transverse direction one above the other, an electromagnetic means and a permanent magnet means for each lever, and wherein said adjustable mounting means extends in a direction transverse to said levers and carries the permanent magnet means for all of said plurality of levers so that the position of said permanent magnet means may be adjusted relative to said levers.

3. An electric overload relay comprising, in combination, electromagnet means including a substantially U-shaped member of magnetizable material having a pair of legs, each having a free end, and current carrying conductor means for magnetizing said member to create a first magnetic field; a lever of magnetizable material mounted intermediate its ends tiltable about a tilting axis located in the region of the free end of one of said legs, said lever extending to opposite sides of said tilting axis and being separated at one end portion thereof by an air gap from the free end of the other leg, at least one of said legs having an end portion inclined in its plane with respect to the remainder of said leg; and permanent magnet means arranged adjacent the opposite end portion of said lever separated by another air gap therefrom and producing a second magnetic field tending to tilt said lever about said pivot axis in a direction opposite to a first direction in which said first magnetic field tends to pivot said lever, said second magnetic field having a magnitude so that said lever is tilting in said first direction only when an overload current of predetermined magnitude flows through said conductor means.

4. An electric overload relay as set forth in claim 3, wherein the end portion of said other leg is inclined in a direction away from said one leg.

5. An electric overload relay as set forth in claim 3, wherein the end portion of said at least one leg is inclined toward the other leg.

6. An electric overload relay comprising, in combination, electromagnetic means including a substantially U-shaped member of magnetizable material having a pair of legs, each having a free end, and current carrying conductor means for magnetizing said member to create a first magnetic field; a lever of magnetizable material mounted intermediate its ends tiltable about a tilting axis located in the region of the free end of one of said legs, said lever extending to opposite sides of said tilting axis and being separated at one end portion thereof by an air gap from the free end of the other leg; permanent magnet means arranged adjacent the opposite end portion of said lever separated by another air gap therefrom and producing a second magnetic field tending to tilt said lever about said pivot axis in a direction opposite to a first direction in which said first magnetic field tends to pivot said lever, said second magnetic field having a magnitude so that said lever is tilted in said first direction only when an overload current of predetermined magnitude flows through said conductor means; and pole shoe means connected to the free end of said other leg of said U-shaped member for reducing the magnetic reluctance of the air gap at the free end of said other leg.

7. An electric overload relay comprising, in combination, electromagnetic means including a substantially U-shaped member of magnetizable material having a pair of legs, each having a free end, and current-carrying conductor means for magnetizing said member to create a first magnetic field, said current-carrying conductor means being in the form of a substantially straight conductor passing between said legs of said U-shaped member; a lever of magnetizable material mounted intermediate its ends tiltable about a tilting axis located in the region of the free end of one of said legs, said lever extending to opposite sides of said tilting axis and being separated at one end portion thereof by an air gap from the free end of the other leg; and permanent magnet means arranged adjacent the opposite end portion of said lever separated by another air gap therefrom and producing a second magnetic field tending to tilt said lever about said pivot axis in a direction opposite to a first direction in which said first magnetic field tends to pivot said lever, said second magnetic field having a magnitude so that said lever is tilted in said first direction only when an overload current of predetermined magnitude flows through said conductor means.

8. An electric overload relay as set forth in claim 7, wherein said single conductor forms a portion of an uninterrupted insulated conductor to be guarded by said overload relay.

9. An electric overload relay as set forth in claim 7, wherein said single conductor is connected at opposite ends thereof in parallel to a conductor to be guarded by said overload relay.

10. An electric overload relay as set forth in claim 1, wherein said adjustable mounting means are constructed to permit an adjustment of said permanent magnet means in longitudinal direction of said lever.

11. An electric overload relay as set forth in claim 1, wherein said adjustable mounting means are constructed to permit adjustment of the position of said permanent magnet means in a direction extending transverse to said lever.

12. An electric overload relay as set forth in claim 1, wherein said mounting means include a carriage movable in direction transverse to said lever and a bracket carrying said permanent magnet means and mounted on said carriage means tiltable about an axis substantially parallel to said tilting axis.

13. An electric overload relay as set forth in claim 2, wherein said common mounting means is in the form of an elongated carriage extending in a direction transverse to said levers and carrying said permanent magnet means spaced in longitudinal direction of the carriage from each other, and including guide means cooperating with said carriage for guiding the same in longitudinal direction, and operating means engaging said carriage for moving the same in said longitudinal direction.

14. An electric overload relay as set forth in claim 2, and including a bracket for each of said permanent magnet means for supporting the same, and fastening means fastening each bracket on said common support means tiltable about an axis parallel to said tilting axis so that the position of each of said permanent magnet means to the respective lever may be individually adjusted by tilting the respective bracket about the respective axis.

References Cited

UNITED STATES PATENTS 3,158,795  11/1964  Carr _____ 335—229
3,201,543  8/1965  Leonard _____ 335—41 XR

FOREIGN PATENTS 1,129,189  9/1956  France.

GEORGE HARRIS, *Primary Examiner.*